Patented Dec. 6, 1938

2,139,550

UNITED STATES PATENT OFFICE 2,139,550

MONO-ALKYL-CHLOROPHENOLS

Emil Klarmann, Jersey City, N. J., assignor to Lehn & Fink Products Corporation, Bloomfield, N. J., a corporation of Delaware No Drawing. Application November 13, 1934, Serial No. 752,835

3 Claims. (Cl. 260—623)

The present invention relates to certain chlorophenols having a single hydrocarbon radical substituted in the ring of the phenol, such compounds having a high bactericidal effectiveness against certain bacteria, and more particularly to such chloro-phenol compounds in which the substituting hydrocarbon group has at least 4 carbon atoms. The substituting hydrocarbon radical may be, for example, an alkyl, an aralkyl, or other hydrocarbon radical. This application is a continuation in part of my prior application Serial No. 630,784, filed August 29, 1932, and is more particularly directed to such compounds wherein the substituting hydrocarbon radical is in the 4 position and the chlorine atom in the 2 position with respect to the hydroxyl group of the phenol.

Chloro-phenols of the character hereinbefore referred to may be prepared by a number of different methods. In one method suitable for the purpose, an acyl chloride or other acyl halide containing the same number of carbon atoms as the alkyl group which it is desired to substitute in the chloro-phenol, is caused to react upon an ortho-chloro-phenol with the formation of the corresponding ester of the chloro-phenol. By suitable means, for example, by treatment with anhydrous aluminum chloride, a rearrangement of such ester is effected with the formation of a chloro-phenyl-alkyl-ketone in which the hydrocarbon radical contains one $CH_2$-group less than the hydrocarbon-substituting group in the final product. The ketone is then reduced, forming the desired mono-hydrocarbon-substituted chloro-phenol.

Or, if desired, a similar sequence of reactions may be carried out, beginning with phenol and an acyl chloride, resulting in the production of a phenol having a hydrocarbon radical substituted in the 4 position, chlorine being introduced into the ortho position in this compound, for example, by treatment with sulfuryl chloride in carbon tetrachloride solution or by other suitable chlorinating agent.

For example, 4-amyl-2-chloro-phenol may be prepared in the following manner:

Phenyl valerate is prepared by the reaction of approximately stoichiometrical quantities of phenol and n-valeryl chloride; for example, 47 parts of the former and 63.2 parts of the latter. The reaction may be effected by mixing the reacting substances and permitting them to stand for a sufficient period to secure reaction, suitably with mild heating. Reaction may be completed by heating for a short time in a steam bath and any excess of the valeryl chloride decomposed by the addition of water. The ester is separated by distillation in a vacuum, its boiling point being about 100–102° at 2 mm. Hg. pressure. To about 87 parts of the resulting ester, dissolved in a sufficient quantity of nitro benzene, say 330 parts by weight, about 61 parts of anhydrous aluminum chloride are added. The mixture is allowed to stand for about 12 hours, then warmed to 50 to 60° C. and held at this temperature with constant stirring for a sufficient period to secure reaction. 4-hydroxy-valero-phenone is formed; it is separated by extraction with diluted potassium hydroxide and purified by distillation under vacuum. It distills at about 182–183° under 3 mm. Hg. pressure. The ketone is reduced by means of amalgamated zinc and hydrochloric acid to the corresponding 4-n-amyl-phenol, which is separated by vacuum distillation and chlorinated in carbon tetrachloride by means of sulfuryl chloride. 4-n-amyl-2-chloro-phenol is formed and distills at 115–116° C. under 2 mm. Hg. pressure. It has a phenol coefficient of 32.1 with respect to *E. typhi* and of 375 with respect to *Staph. aureus*.

Other methods may be employed for the preparation of compounds according to the present invention. Thus derivatives with either straight or branch side chains may be prepared by a method in which there is a direct condensation of an alcohol or of an alkyl or arylalkyl halide with ortho-chloro-phenol in the presence of a suitable condensing agent, such as sulfuric acid, zinc chloride, ferric chloride, or the like.

The compounds of the present invention are found to have a bactericidal effectiveness with regard to certain bacteria, such as *Staph. aureus*, markedly higher than lower alkyl-chloro-phenols, or the corresponding halogen free alkyl phenols. And in general, although not always, their effectiveness toward bacteria of other types is rather higher than that of the lower alkyl-chloro-phenols or of the corresponding halogen free alkyl phenols.

The following example, in addition to that heretofore given, as illustrative of the present invention.

4-n-butyl-2-chloro phenol; phenol coefficient with respect to *Staph. aureus* about 150, although with some strains, it may be in the order of 95. The compound is an oily liquid boiling at 110–115° C. at 3 mm. Hg. and at 247–248° C. at 760 mm. Hg.

Other branch-chain substituted compounds in which the substituting group has 4 or more carbon atoms, such as those of the butyl, amyl, heptyl and hexyl isomers are likewise effective bactericidal agents.

I claim:
1. A 4-n-alkyl-2-chloro-phenol wherein the normal alkyl group has at least 4 carbon atoms.
2. 4-n-butyl-2-chloro-phenol.
3. 4-n-amyl-2-chloro phenol.

EMIL KLARMANN.